April 12, 1949.   C. FOWLER   2,466,939
SWIVEL TROTLINE STAGING SNAP
Filed Sept. 22, 1944
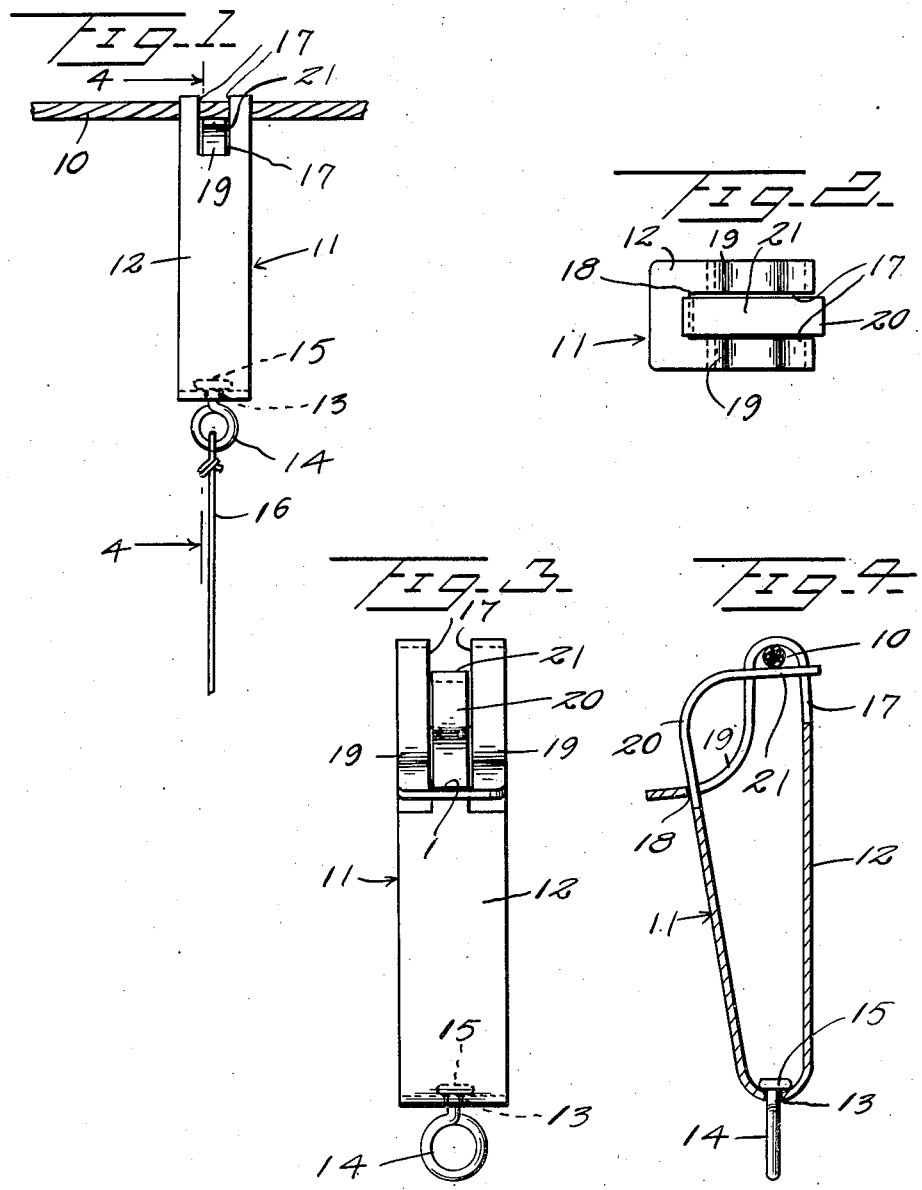
Inventor
Curtis Fowler
By L. F. Randolph
Attorney Patented Apr. 12, 1949

2,466,939

UNITED STATES PATENT OFFICE 2,466,939

SWIVEL TROTLINE STAGING SNAP

Curtis Fowler, Chula Vista, Calif.

Application September 22, 1944, Serial No. 555,361

2 Claims. (Cl. 24—237)

This invention relates generally to snaps and more particularly to a swivel trotline staging snap of new and improved design in which the snap may be attached to the trotline either by pressing the snap against the line or by compressing the snap and thereafter hooking it over the line, and in which a swivel, to which the leader or staging is secured, is attached to the snap whereby twisting of the staging by a fish hooked thereto is prevented, thus avoiding the possibility of the fish tearing the hook from its mouth or in bending the hook sufficiently to free itself therefrom.

Still other objects and advantages of the invention will become apparent from the description of the preferred embodiment thereof, hereinafter described in detail in connection with the accompanying drawings wherein:

Figure 1 is a view in elevation of a snap according to the present invention attached to a trotline and having a leader or staging secured thereto;

Figure 2 is a somewhat enlarged top plan view of the snap shown in Figure 1;

Figure 3 is a somewhat enlarged rear elevation of the snap shown in Figure 1, and Figure 4 is a somewhat enlarged sectional view as seen along the line 4—4 of Figure 1.

Referring now to the drawings, the numeral 10 designates a trotline to which a snap generally designated by the numeral 11 is secured. Snap 11 preferably is formed of a unitary strip 12 of inherently springy or resilient material which is shaped generally in the form of a double-U, of which the bottom U, at the bight portion thereof is provided with a hole or suitable opening 13 in which a ring 14 is freely swiveled, the ring preferably being formed of a single length of wire or thin rod shaped to form a closed loop or ring and terminating in a straight portion which enters the aperture 13 and which may be riveted as at 15 so as to be securely connected to the snap body 12. The staging or leader 16 is tied or otherwise secured to the ring 14 in any conventional manner.

Strip or snap body 12 at the upper U thereof is provided with a slot 17 which terminates at a stop 18 just short of one end of the strip, this end of the strip being gradually curved outwardly as at 19 for the purpose to become more fully apparent hereinafter. The other end of the strip 12 is narrowed sufficiently to form a tongue portion 20 adapted freely to move within the slot 17 as the ends of the strip are moved with respect to each other. Tongue 20 is gradually curved inwardly and terminates in a flat portion 21 which is sufficiently near the bight portion of the upper U of strip 12 so as to yieldably engage the trotline inserted therebetween with sufficient force such that the snap is prevented from sliding along the line by reason of tension normally applied to the snap when a fish is hooked thereto.

Tongue 20 normally is urged yieldably into engagement with stop 18 by reason of the initial tension set up in the lower U portion of the spring body or strip 12. Thus, as the tongue moves to engage the stop 18, the flat portion 21 thereof is urged upward toward the bight portion of the upper U, thereby coacting to squeeze the trotline therebetween.

The snap may be attached to the trotline, as shown in Figures 1 and 4, merely by pressing the snap against the line such that the line moves along the gradually curved portion or end 19 and the tongue 20 of the snap until the line reaches the bight portion of the upper U, as shown, whereupon the tongue 20 returns automatically to stop 18 by reason of the initial tension in the snap. Or, if desired, the snap may be compressed by squeezing the same at the lower U thereof and thereafter hooking the snap over the line.

While the invention has been described in particularity with respect to but a single example thereof which gives satisfactory results, it will be apparent to those skilled in the art that the invention is susceptible of additional examples and variations thereof and it is the intention herein, therefore, to cover the full range of equivalents commensurate with the scope of the invention as defined by the appended claims.

I claim as my invention:

1. A snap adapted to be attached to a trotline, comprising a unitary strip of inherently springy material shaped substantially to form a pair of opposed U-portions one of which U-portions is slotted to a point adjacent one end of the strip thereby providing a stop therein and said end of the strip being gradually curved outwardly of said one of said U-portions, the other end of said strip terminating in a tongue portion which curves inwardly and is adapted freely to pass within said slot into engagement with said stop under the biasing action of initial tension provided in the other of said U-portions, said stop projecting outwardly from the last mentioned strip end to facilitate applying the snap to the trotline, and said tongue terminating in a flat portion disposed subjacent to the bight portion of said one of said U-portions whereby the trotline may yieldably be inserted therebetween by moving the line along the tongue and the first named end of said strip until the line snaps into the attached position thereof.

2. In a trotline leader snap, a strip of resilient material having normally diverging legs, one of legs terminating in an inturned hook portion having a slot extending from adjacent the bill of the hook into said leg, the other leg having a restricted terminal portion forming a tongue, said tongue normally extending through the slot adjacent the bill and being turned inwardly therebeyond, whereby the terminal of the tongue passes through the slot at two points subjacent to the bight portion thereof, said tongue being slidably disposed in the slot and normally in engagement with the bill of the hook, the bill of the hook projecting outwardly from the last mentioned leg to facilitate applying the snap to a trotline.

CURTIS FOWLER.

REFERENCES CITED

The following references are of record in the file of this patent:

UNITED STATES PATENTS

| Number | Name | Date |
| --- | --- | --- |
| 149,751 | Hall | Apr. 14, 1874 |
| 542,803 | Palmer | July 16, 1895 |
| 548,554 | Johnson | Oct. 22, 1895 |
| 1,231,742 | Hurlbut | July 3, 1917 |
| 1,447,429 | Reimers | Mar. 6, 1923 |
| 1,844,652 | Harley | Feb. 9, 1932 |
| 2,150,074 | McLure | Mar. 7, 1939 |

FOREIGN PATENTS

| Number | Country | Date |
| --- | --- | --- |
| 25,037 | Great Britain | A. D. 1903 |